United States Patent
Chalmers et al.

(10) Patent No.: US 10,178,524 B2
(45) Date of Patent: Jan. 8, 2019

(54) VEHICLE WIRELESS DEVICE DETECTION

(71) Applicant: Distracted Driving Holding Company, LLC, Ridgeland, MS (US)

(72) Inventors: Jeremy Chalmers, Philadelphia, MS (US); Keith Morgan, Madison, MS (US); Stephen Stewart, Jackson, MS (US)

(73) Assignee: STOPCELL, LLC, Ridgeland, MS (US)

( * ) Notice: Subject to any disclaimer, the term of this patent is extended or adjusted under 35 U.S.C. 154(b) by 0 days.

(21) Appl. No.: 15/717,693

(22) Filed: Sep. 27, 2017

(65) Prior Publication Data

US 2018/0070214 A1  Mar. 8, 2018

Related U.S. Application Data

(60) Division of application No. 14/985,925, filed on Dec. 31, 2015, now Pat. No. 10,028,106, which is a
(Continued)

(51) Int. Cl.
| | |
|---|---|
| *H04W 4/40* | (2018.01) |
| *G01S 19/13* | (2010.01) |
| *H04W 4/04* | (2009.01) |
| *H04K 3/00* | (2006.01) |
| *H04W 4/02* | (2018.01) |

(Continued)

(52) U.S. Cl.
CPC ............... *H04W 4/40* (2018.02); *B60Q 9/00* (2013.01); *G01S 19/13* (2013.01); *H04K 3/415* (2013.01); *H04K 3/45* (2013.01); *H04K 3/68* (2013.01); *H04M 1/7253* (2013.01); *H04M 1/72577* (2013.01); *H04W 4/027* (2013.01); *H04W 4/046* (2013.01); *H04K 2203/16* (2013.01); *H04K 2203/22* (2013.01); *H04L 67/26* (2013.01); *H04W 4/38* (2018.02)

(58) Field of Classification Search
CPC .... H04M 1/72577; H04L 67/26; G01S 19/13; H04W 4/027; H04W 24/08; H04W 4/04; H04W 4/14; H04W 4/006; H04W 4/046; H04K 2203/16; H04K 2203/22; H04K 3/415; H04K 3/68; H04K 3/45; B60Q 9/00

See application file for complete search history.

(56) References Cited

U.S. PATENT DOCUMENTS

| | | |
|---|---|---|
| 8,249,665 B2 | 8/2012 | Rathus et al. |
| 8,461,973 B2 | 6/2013 | Reed et al. |
| (Continued) | | |

*Primary Examiner* — Erica Navar
(74) *Attorney, Agent, or Firm* — Fish IP Law, LLP

(57) ABSTRACT

The disclosure includes an apparatus comprising a diagnostic unit configured to communicate with a rules engine to determine whether a transmission detected in a vehicle is classified as unauthorized wireless device usage based on characteristics of RF signals received by a Detector Module collocated with the vehicle, geographic location data, and, optionally, additional secondary data, such determination being made by an external Rules Engine that is in communication with the Detector Module. The Rules Engine can provide instructions to and modify various threshold values used for preliminary RF signal analysis by the Detector Module.

27 Claims, 8 Drawing Sheets

Related U.S. Application Data continuation-in-part of application No. 14/745,148, filed on Jun. 19, 2015, now Pat. No. 9,866,348, which is a continuation of application No. 13/776,255, filed on Feb. 25, 2013, now abandoned.

(60) Provisional application No. 62/098,829, filed on Dec. 31, 2014, provisional application No. 61/692,467, filed on Aug. 23, 2012, provisional application No. 61/602,722, filed on Feb. 24, 2012.

(51) Int. Cl.
| | | |
|---|---|---|
| *H04M 1/725* | (2006.01) | |
| *B60Q 9/00* | (2006.01) | |
| H04L 29/08 | (2006.01) | |
| H04W 4/38 | (2018.01) | |

(56) References Cited

U.S. PATENT DOCUMENTS

| | | |
|---|---|---|
| 8,787,936 B2 | 7/2014 | Tibbitts et al. |
| 2004/0215382 A1 | 10/2004 | Breed et al. |
| 2007/0072616 A1 | 3/2007 | Irani |
| 2007/0281603 A1 | 12/2007 | Nath et al. |
| 2009/0253423 A1 | 10/2009 | Kullberg |
| 2010/0148920 A1 | 6/2010 | Philmon et al. |
| 2010/0210254 A1 | 8/2010 | Kelly et al. |
| 2011/0009107 A1 | 1/2011 | Guba et al. |
| 2011/0105097 A1 | 5/2011 | Tadayon et al. |
| 2012/0015625 A1* | 1/2012 | Mendenhall ...... H04M 1/72577 455/405 |
| 2012/0231773 A1 | 9/2012 | Lipovski |

* cited by examiner

VEHICLE WIRELESS DEVICE DETECTION

The present application is divisional application of U.S. patent application Ser. No. 14/985,925, filed Dec. 31, 2015, which claims the benefit of U.S. Provisional Application No. 62/098,829, filed on Dec. 31, 2014. U.S. patent application Ser. No. 14/985,925 is also a continuation in part of U.S. patent application Ser. No. 14/745,148, filed on Jun. 19, 2015, which is a continuation of U.S. patent application Ser. No. 13/776,255, filed on Feb. 25, 2013, which claims the benefit of U.S. Provisional Application No. 61/692,467, filed on Aug. 23, 2012, and U.S. Provisional Application No. 61/602,722, filed on Feb. 24, 2012, all of which are incorporated herein by reference as if reproduced in their entirety.

FIELD OF THE INVENTION

The field of the invention is wireless device detection in vehicles.

BACKGROUND

The following description includes information that may be useful in understanding the present invention. It is not an admission that any of the information provided herein is prior art or relevant to the presently claimed invention, or that any publication specifically or implicitly referenced is prior art.

Use of wireless devices while driving is a major cause of accidents in the United States. Wireless devices can comprise a broad category of devices such as cellular phones, smart phones, laptop personal computers (PCs), tablet PCs, portable game systems, electronic book readers, etc. Employers, parents, vehicle rental companies, and other vehicle owners can loan a vehicle to a third party driver who will likely own a wireless device. Such devices can be used by owners who are also drivers and are therefore responsible for their own actions. Frequently, however, a vehicle owner has limited (if any) control over the actions of a driver that is merely using the vehicle, but can be partially or completely responsible for the results of any automobile accidents that are caused by the driver. Such vehicle owners may be unaware of a driver's usage of a wireless device in their vehicle under such circumstances and has few options for curtailing such activity.

Detection systems can be installed in the vehicle, however current detection systems have difficulty in distinguishing between driver wireless device usage and permitted wireless device usage by passengers. For example, U.S. Pat. No. 7,474,264 (to Bolduc et al) describes a detection system that utilizes a number of receiving antennas located at various positions within the vehicle, and uses differences in signal strength measured at these antennas to attempt to ascertain the location of a transmitting wireless device within the vehicle. All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. The practicality of isolating an RF signal within what is essentially a highly RF reflective enclosure is highly problematic, however, and such a system is highly susceptible to interference from both external RF sources and from RF reflective material (for example, metallic foil or mylar packaging) located within the vehicle. U.S. Pat. No. 8,249,665 (to Rathus and Olivo) describes a system that includes a controller that can communicate with and shut down a wireless device should it detect wireless device usage in an unauthorized area or situation. The described system, however, similarly utilizes simple signal strength characterization in order to determine the position of the transmitting wireless device and is subject to the same limitations. U.S. Pat. No. 8,787,936 (to Tibbitts and Nabkel) describes a system that identifies the position (and in some embodiments, the simple presence) of a transmitting wireless device using one or more RF detectors and utilizes a centralized processing system to disable functions of devices being used in an unauthorized manner. Such a system, however, can be readily circumvented by using a wireless device that does not include the software necessary to support disabling functionality.

In addition to these shortcomings the systems noted above can be susceptible to sources of RF interference. Examples of such interference include RF transmissions from wireless devices near the vehicle (e.g. pedestrians or adjacent vehicles), transmission from other RF sources within the vehicle, and "spillover" from nearby sources of strong RF transmissions. United States Patent Application Publication NO. 2004/0203393 (to Chen) describes a method for distinguishing RF signals occurring within the same spectrum by subdividing a broad frequency range into a number of adjacent narrow frequency bands. The set of adjacent narrow frequency bands is subdivided into two sets of interdigitated narrow frequency bands. The frequency peaks of the individual bands are set at half of the frequency range of the narrow band, permitting differentiation of the members of the two sets by rolloff filtering. Such a method, however, is not readily applicable to removal of interference, which is unlikely to occur at an optimal frequency. U.S. Pat. No. 8,718,024 (to Jagger et al) describes a method for suppressing interference within a wide frequency band by detecting a number of narrow frequency band signals within the wide frequency band, using the signal strength at each of the narrow frequency bands to determine a composite wide band power level, and determining a threshold value based on the composite power level. This threshold value is then utilized to filter and suppress the signal received from specific narrow band receivers.

Thus, there is still a need for systems and methods that reliably identify unauthorized or non-permitted use of a wireless device in a vehicle.

SUMMARY OF THE INVENTION

In systems and methods of the inventive concept a detection system that includes a Detector Module, located on or in the vehicle, is configured to communicate with an external Rules Engine to determine whether a transmission detected in a vehicle is classified as unauthorized wireless device usage. RF transmissions are received by the Detector Module in sweeps of two or more of the RF bands that have been allocated for use. For example, an RF sweep can encompass all seven RF bands allocated for use. Data from received transmissions undergo preliminary processing in the Detector Module via comparison to a set of stored threshold values. Sets of threshold values are associated with each RF band, and threshold values can be modified on instructions from the Rules Engine. Threshold values used for preliminary processing in the Detector Module can include RF energy associated with the received signal, duration of the received RF signal, and the number of times that the received RF signal exceeds both energy and duration thresholds over a defined period of time. Based on such threshold values an RF signal can be identified as potentially representing an unauthorized transmission, and a data packet of information related to the signal can be transmitted to the Rules Engine from the Detector Module. Such a data packet includes information related to the RF band within which the RF transmission resides, number of times that the RF signal has exceeded energy and duration thresholds within a defined time period, and other signal related data. The Detector Module can also transmit data related to vehicle status, GPS coordinates, and other secondary information to the Rules Engine.

Within the Rules Engine information from the data packet is utilized with additional data received from the Detector Module to determine if the received RF signal represents an unauthorized transmission. In some embodiments GPS data related to the vehicle can be used to determine if the vehicle is stationary. In other embodiments GPS data can be used to determine that the vehicle is proximal to a known stationary source of interfering RF transmissions. In other embodiments secondary data can indicate the presence of a passenger. In other embodiments the secondary data can indicate that a Bluetooth hands-free device is in use. In still other embodiments, secondary data can indicate the existence of an emergency condition at the vehicle. Such data can be used by the Rules Engine to determine that a potential unauthorized RF transmission is, for example, allowed under the immediate circumstances or a result of interference.

Determination that an unauthorized RF transmission has occurred can result in the Rules Engine transmitting one or more instructions to the Detector Module. Such instruction can include transmission of an audible and/or visible alarm. In some embodiments the Detector Module can activate a shielding unit in response to an instruction from the Rules Engine. The Rules Engine can also provide email or text messages to the vehicle user and/or the vehicle owner advising of such unauthorized wireless device usage and can keep a log of such events.

These and other features will be more clearly understood from the following detailed description taken in conjunction with the accompanying drawings and claims. Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1A depicts steps of the process that are carried out within a Detector Module located with a vehicle. FIG. 1B is a continuation of FIG. 1A, and primarily depicts steps carried out in a remote Rules Engine that is in communication with the Detector Module.

DETAILED DESCRIPTION

Figure 1A:
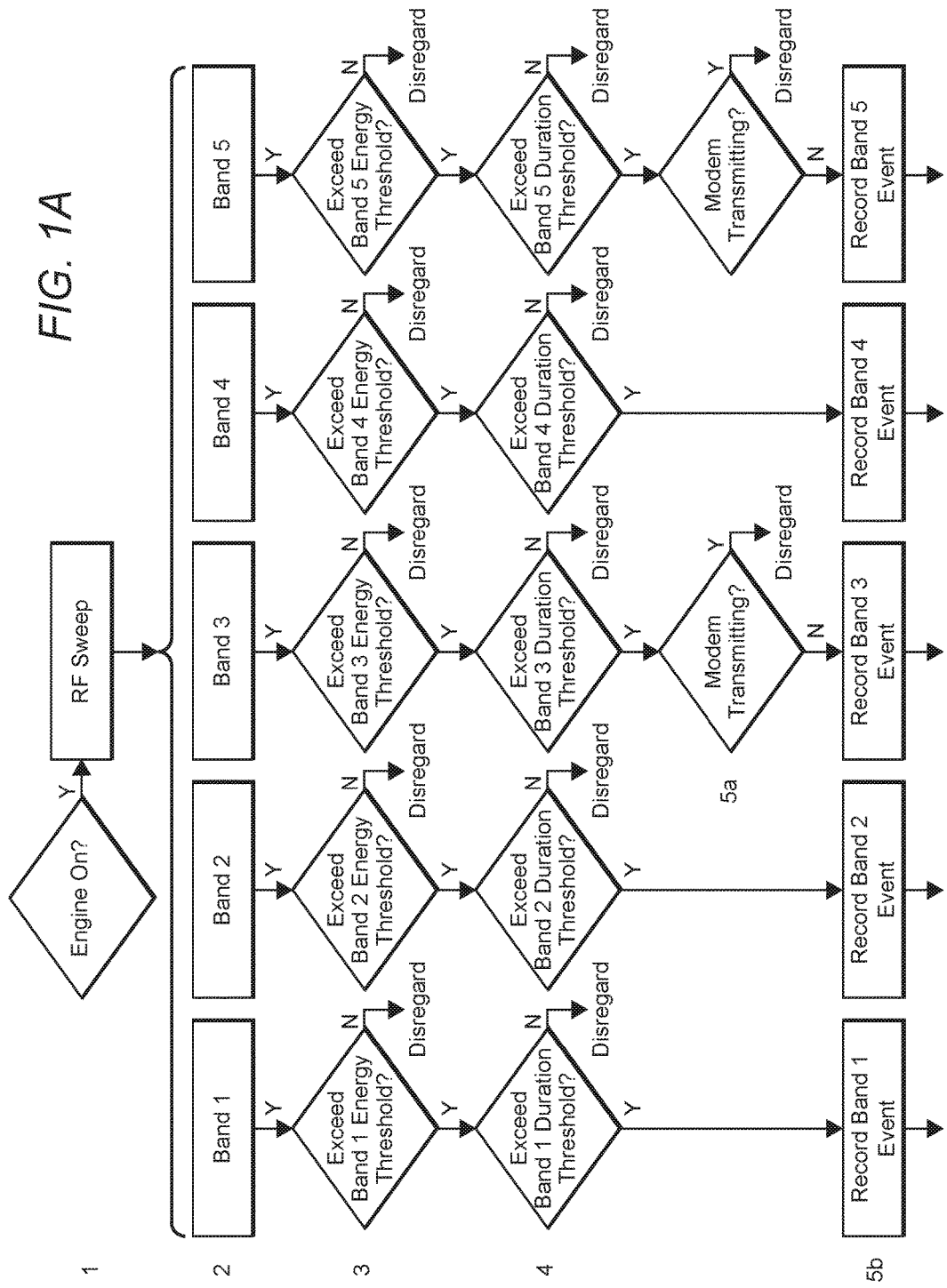
FIG. 1A and FIG. 1B schematically depict a logic process carried out to determine if a received RF signal is an unauthorized transmission.

It should be understood at the outset that, although an illustrative implementation of one or more embodiments are provided below, the disclosed systems and/or methods can be implemented using any number of techniques, whether currently known or in existence. The disclosure should in no way be limited to the illustrative implementations, drawings, and techniques illustrated below, including the exemplary designs and implementations illustrated and described herein, but can be modified within the scope of the appended claims along with their full scope of equivalents.

Disclosed herein is a vehicle mobile device detection and transmission shielding system. The system can comprise a Detector Module positioned in the vehicle in communication with a remote Rules Engine. The Detector Module can detect a wireless device transmission in the vehicle compartment, provide initial data processing, and send transmission data to the Rules Engine to determine if the transmission should be classified as potential unauthorized wireless device usage. The Detector Module can also transmit additional data, including GPS data, vehicle status data, and/or passenger data to assist in the classification. The Rules Engine can, for example, classify a received transmission from classification as potential unauthorized wireless usage and take no action if the transmission occurred while the vehicle engine is off, if the transmission occurred while the vehicle is stationary, and/or if the transmission is identified as originating from an interfering source (for example, by falling below one or more specified cutoff values and/or occurring at or near a known stationary source of RF interference). The Detector Module can receive vehicle status data from a vehicle diagnostic port and/or a global positioning system (GPS). In some embodiments the Rules Engine can also classify a transmission as authorized wireless device usage if passenger data indicates a passenger is present in the vehicle at the time of the transmission. Passenger data can be received from the diagnostics port or other sensors such as seat belt sensors, seat pressure sensors, infrared sensors, biosensors, radio frequency identification (RFID) sensors, etc. When such passenger data indicates that no passenger (i.e. an occupant of the vehicle that is not directly involved in operating the vehicle) the rules engine can classify the transmission as unauthorized wireless device usage. The Rules Engine can then transmit real time alerts to the vehicle owner, signal the Detector Module to play or display an alert in the vehicle, and/or initiate a shielding unit. Such a shielding unit can, for example, transmit a noise signal that interferes with the function of the wireless device. Such a noise signal can be transmitted across a plurality of frequency bands, across a frequency band associated with an uplink of the transmission, across a frequency band associated with a downlink of the transmission, and/or at a specific frequency used during the transmission.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

While several embodiments have been provided in the present disclosure, it can be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components can be combined or integrated in another system or certain features can be omitted, or not implemented.

In addition, techniques, systems, subsystems, and methods described and illustrated in the various embodiments as discrete or separate can be combined or integrated with other systems, modules, techniques, or methods without departing from the scope of the present disclosure. Other items shown or discussed as coupled or directly coupled or communicating with each other can be indirectly coupled or communicating through some interface, device, or intermediate component whether electrically, mechanically, or otherwise. Other examples of changes, substitutions, and alterations are ascertainable by one skilled in the art and can be made without departing from the spirit and scope disclosed herein.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the disclosed systems and methods provide many advantageous technical effects including the use of both local and remote processing to reduce the transmission and computational burden on compact devices within the vehicle, while supporting functions that require significant processing power. This distributed processing also facilitates both mass and individual updates of system components associated with individual vehicles. It should also be appreciated that the system of the instant invention does not depend on the nature of the wireless device or on the software employed by same.

Embodiments of the inventive concept include a Detector Module that is within a vehicle where a wireless device transmission may take place. The Detector Module includes or is communicatively coupled to an antenna or similar device that is configured to receive an RF signal from the wireless device transmitting within the vehicle. In some embodiments an antenna module is communicatively coupled to the Detector Module, and transfers RF data received through an antenna to the Detector Module, for example in digitized form. As defined within this application, the Detector Module is a distinct and separate entity from the wireless device. A Detector Module of the inventive concept can be an after-market module that is added to a vehicle following assembly or it can be integrated into the vehicle as part of its design.

It should be appreciated that a given wireless device transmits (for example, to a cellular network) on an RF frequency that lies within a range of RF frequencies designated for use by such devices. For example, a cellular phone configured for use by one service provider can transmit to the corresponding cellular network on a different frequency from that of a different cellular phone configured for use by a different service provider, however both transmitting frequencies would lie within an RF frequency range designated for use by cellular networks. In some embodiments of the inventive concept a Detector Module can include a wide band RF receiver which, in use, performs repeated detection "sweeps" at defined intervals across a range of RF frequencies that encompasses RF frequencies utilized in wireless communication devices. For example, such an RF receiver can sweep the allocated RF frequencies ranging from 3 Hz to 300 GHz. These are typically organized into seven RF "bands", which are subsequently subdivided into narrower ranges or channels designated for specific purposes. In such an embodiment the RF sweep can be performed over a range of RF bands that include RF frequencies that are not utilized by wireless communication devices to be identified by the system (for example, a cellular phone). Such a sweep can include 2, 3, 4, 5, 6, or all 7 RF bands currently allocated for use. The interval over which such sweeps are performed can range from 1 millisecond to 10 seconds or more, and in some embodiments can be configured by a remote Rules Engine with which the Detector Module is in communication. In a preferred embodiment of the inventive concept such an RF receiver is deactivated in instances when the Detector Module is transmitting (for example, when communicating with the Rules Engine). In some embodiments this temporary deactivation of the RF receiver can be extended for a period of time (for example 1 second to 1 minute) beyond the time such a transmission has ceased.

Signals received by the Detector Module undergo initial processing within the Detector Module in order differentiate them from sources of RF other than the wireless device within the vehicle and from sources of RF interference. Potential sources on non-relevant RF include transmissions from wireless devices outside of the vehicle (for example, devices in use by pedestrians or occupants of other vehicles) and signal "spillover" from stationary sources such as cell phone towers. These non-relevant signals are differentiated by a processor within the Detector Module, which compares signal parameters to threshold values stored in an associated database to determine if the received signal originates from a wireless device within the vehicle or is non-relevant. Suitable parameters that are evaluated to provide such a determination include signal frequency, signal strength, and signal duration. It should be appreciated that the threshold values used to determine this are dependent on a number of factors, including the type of vehicle and the area in which it is being used. Such threshold values can be static values that are permanently stored in a database associated with the processor of the Detector Module. In a preferred embodiment the threshold values stored in the database can be adjusted, for example on being updated by an external source (such as a Rules Engine), through a calibration process, or on a dynamic basis during use. This advantageously permits adjustment of threshold values during use, for example as a vehicle equipped with a system of the inventive concept travels through areas (e.g. based on GPS data) that include different potentially interfering RF signal sources.

Figure 1B:
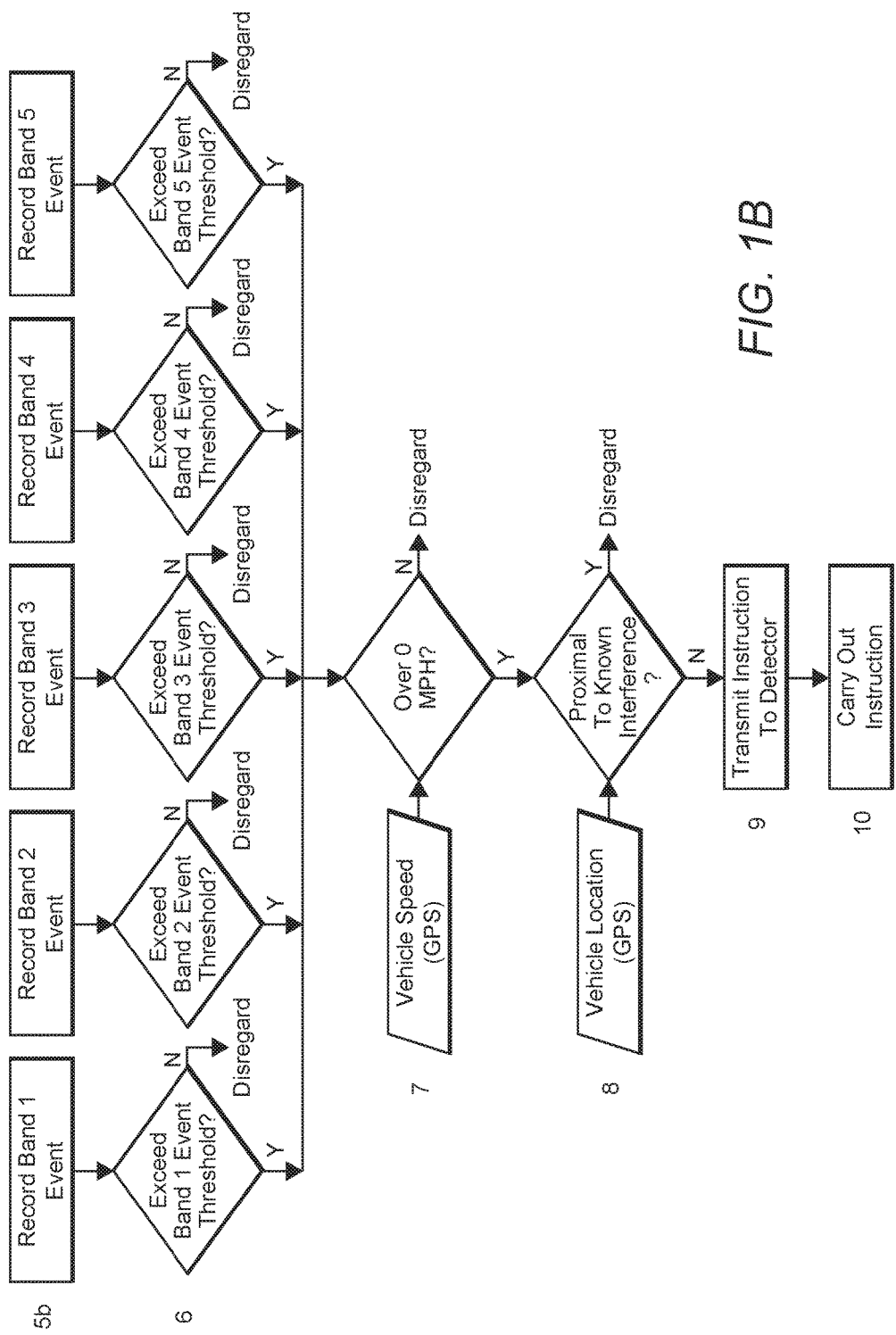

An example of a signal filtering process as performed by a system of the inventive concept is shown in FIG. 1A and continued in FIG. 1B. As shown in step 1 of FIG. 1A the system performs an initial check to verify that the vehicle engine is on (e.g. the ignition key is engaged, the electrical system is activated, the starter has been engaged, and/or the engine is currently running) before initiating RF sweeps by the RF receiver of the detector module. These sweeps are performed over predetermined intervals, which can range from 1 millisecond to 1 minute or longer and are stored in a database that is associated with the Detector Module. In some embodiments the interval over which a sweep is performed is between 5 milliseconds and 100 milliseconds. In other embodiments the interval over which a sweep is performed is between 10 milliseconds and 50 milliseconds. In a preferred embodiment the time interval over which a sweep is performed is about 20 milliseconds. It should be appreciated, however, that the timer interval over which an RF sweep is performed can be modified, for example in response to an instruction from an external Rules Engine.

As shown in step 2 of FIG. 1A, the RF sweep covers two or more RF bands that are assigned for use. While five bands are shown, it should be appreciated that as few as two bands or as many as all seven available bands can be used. As noted above, the bands selected encompass and can exceed the RF range of the frequencies to be detected by the system. Such a sweep necessarily receives a wide range of RF transmissions, relatively few (if any) of which are actually associated with unauthorized wireless use in the vehicle. Such signals are differentiated by the application of "filters" in the form of comparison to certain threshold values, combined with position information and logical operations. As shown in step 3 of FIG. 1A, one of these thresholds is related to the energy of the received RF signal. It should be appreciated that such RF energy thresholds are individually assigned to each RF band monitored, and that such RF energy thresholds can be modified on receipt of instructions from an external Rules Engine. Such RF energy thresholds can, for example, be modified in response to the location of the vehicle. If a received RF signal exceeds an RF energy threshold for the band it is associated with, the duration of the received RF signal is measured and compared to a signal duration threshold stored in a database that is associated with the Detector Module, and, as shown in step 4 of FIG. 1A. Such thresholds can range from 1 millisecond to 100 milliseconds or more, and can be adjusted on receipt of instructions from an external rules engine.

As noted above, a Detector Module can include a modem or transmitter that permits communication with a Rules Engine of the system. Such a transmitter or model can utilize a portion of the allocated RF spectrum for such communication. The inventors have found that RF transmission from such a modem or transmitter is a significant source of interfering RF signals. As noted above, this can be reduced by halting RF sweeps while transmission occurs (and, in some embodiments, for a short time afterwards). Additionally or alternatively, the impact of RF transmission by the Detector Module can be reduced or eliminated by applying a logic step within the detector module of disregarding RF signal detections within an RF band utilized by the modem or transmitter of the Detector Module when such a modem or transmitter is in operation (see step 5a of FIG. 1A).

As shown in step 5b of FIG. 1A, if a received RF signal meets the RF energy and duration thresholds, and is not occurring in a band associated with RF transmission by the Detector Module during transmission (as shown in steps 3 to 5a of FIG. 1A), the received RF signal can be recorded as an RF event associated with the band within which it was received (as shown in step 5b of FIG. 1A). As shown in FIG. 1B, which continues from FIG. 1A, such recorded events are accumulated over a specified time period, and a count of such accumulated events compared to an event threshold. Suitable time periods range from 1 millisecond to 2 minutes, and are preferably from 100 milliseconds to 30 seconds.

Such time periods are stored in a database that is associated with the Detector Module, and can be updated on receipt of an instruction from a remote Rules Engine. The event threshold is stored in a database that is associated with the Detector Module, and can range from a single event to up to 10 or more events over the defined time period. Such an event threshold can be modified on receipt of an instruction from a remote Rules Engine. As shown in step 6 of FIG. 1B, if the event threshold is exceeded a data packet representing a potential valid detection is prepared for transmission to the Rules Engine. Such a data packet can include information related to the identity of the RF band within which the received RF signal resides and the accumulated count of RF detection events that exceeded the RF energy, duration, and event thresholds.

As noted above, steps 1 to 5*b* of FIG. 1A represent initial signal processing that takes place within the Detector Module associated with the vehicle. Such a Detector module can receive additional information, including GPS data. Such GPS data can be obtained from GPS circuitry within the Detector Module or can be supplied by an independent GPS device. Such GPS data can include vehicle speed and location data. Alternatively, information related to vehicle speed can be obtained directly from vehicle systems. The Detector Module can utilize a modem or similar transmission device to send a data packet (derived as described above) and GPS data to an external Rules Engine that is in communication with the Detector Module. Within the Rules Engine, further processing of the data received from the Detector Module can determine if a potentially valid detection represents unauthorized wireless usage. As shown in step 7 of FIG. 1B, an initial test is a determination of the speed of the vehicle. Typically, wireless device usage in a non-moving vehicle is permitted and a potentially valid detection can be disregarded if vehicle speed data indicates that the vehicle is not moving.

As shown in step 8 of FIG. 1B, an additional logical test that can be applied is related to the geographic location of the vehicle. The Rules Engine can include data related to the location of known fixed sources of RF interference (for example, commercial radio transmitters, cellular towers, etc.) which have sufficient RF signal energy, duration, and other properties to appear as an unauthorized wireless transmission. In step 8 of FIG. 1B the Rules Engine determines of the vehicle is proximal (i.e. within a defined distance or time period) to such a fixed source of interference, and if so the potentially valid detection can be disregarded. For example, a potentially valid signal associated received within from 1 second to 1 minute of travel time and/or from within 10 feet to 1,000 feet of such a fixed signal source can be disregarded. It should be appreciated that additional logic filters (for example, identification of the use of Bluetooth headsets or of permitted wireless devices) can be applied to identify if a potentially valid detection represents unauthorized wireless usage.

As shown in step 9, on identification of unauthorized wireless usage the Rules Engine can transmit an instruction to the Detector Module. Note that steps 7 to 9, which include additional signal processing steps, occur in the Rules Engine, and that the results of the combined RF signal data analysis are transmitted back to the Detector Module in the form of one or more instructions, which are carried out by the Detector Module in step 10 of FIG. 1B. Such an instruction can be, for example, an instruction to play a recorded or digitized warning sound or verbal warning. Alternatively, the Rules Engine can transmit an email or text message to the wireless device and/or to the owner of the vehicle. In some embodiments the Detector Module can be instructed by the Rules Engine to activate a shielding device, such as an RF noise generator.

Since such systems and methods can scan all available RF frequency bands and utilize a series of customizable threshold values and logic tests to determine the authenticity of an unauthorized transmission they are, advantageously, wireless device agnostic, and are inherently not limited to use with specific types of wireless devices (for example, to cellular phones) or to wireless devices implementing specific software or having particular hardware features. As such they can be readily adapted for use with a wide variety of wireless devices, and cannot be readily circumvented by the use of a wireless device lacking specific enabling software or hardware. In addition, such systems and methods advantageously permit a high degree of adaptability to vehicle type, device type, and vehicle geographic location through modification of threshold values of the Detector Module via the Rules Engine. In addition, information available to the Rules Engine can be modified (for example, GPS coordinates of known fixed sources of RF interference can be updated) and such updates applied globally to one or more Detector Modules that are serviced by the Rules Engine. It should also be appreciated that providing a portion of the processing activity utilized to discern interfering RF transmissions from actual unauthorized wireless device transmissions at a remote Rules Engine advantageously reduces the computational requirements of the Detector Module located within the vehicle, reducing its complexity, size, and power requirements while improving its reliability.

In some embodiments of the inventive concept the Detector Module includes or is communicatively coupled to a secondary RF antenna, for example an antenna configured to receive RF transmissions from a short range transmitter such as a Bluetooth device (for example, a Bluetooth headset). Such transmissions can include data related to unique identifiers associated with a specific Bluetooth equipped device, and data related to such transmissions can be transmitted to the Rules Engine along with data related to RF transmissions from a wireless device that are associated with voice or data. In some embodiments, the Detector Module can utilize such data to determine that a Bluetooth device (for example, a hands-free headset) is in use within the vehicle simultaneously with a wireless device. In other embodiments, such Bluetooth data can provide a unique identifier associated with a specific wireless device. Such data can be forwarded to the Rules Engine and utilized in additional logic operations. For example, identification of the use of a Bluetooth headset can cause the Rules Engine to disregard RF transmissions that would otherwise qualify as unauthorized wireless device use. Such a logic operation can include an additional step of verifying the geographic location of a vehicle as being within a jurisdiction that permits "hands free" headset use while driving. Alternatively, Bluetooth headset use can be identified by the Detector Module, and potential unauthorized RF transmissions disregarded prior to transmission of related data to the Rules Engine. Similarly, data related to unique wireless device identifiers can be compared to a "white list" stored in the database associated with the Rules Engine or of the Detector Module to determine the identity and nature of the Bluetooth device and/or an associated wireless device. In some embodiments a white list of a database associated with the Detector Module can be updated by the Rules Engine, for example based on direct input by a user or by an authentication process carried out via the wireless device. Such identification can, for example, permit the Detector Module to differentiate a Bluetooth headset in use by a driver from a Bluetooth game controller in use by a child passenger. In some embodiments, data related to such Bluetooth or other secondary RF transmissions are routed to an external Rules Engine, where stored white list data can be used to make a similar determination to not provide an instruction to the Rules Engine in the presence of an otherwise qualifying RF signal.

In embodiments of the inventive concept the Detector Module is in communication with a Rules Engine that is located remotely from the vehicle, for example an external server. The Rules Engine can be in communication with more than one Detector Module. Such communication can take place over cellular RF frequencies, WiFi RF frequencies, or any suitable method. The Rules Engine receives processed RF transmission data (i.e. data packets related to received RF transmissions) and other data (for example, GPS data, Bluetooth transmission data, Bluetooth identity data, etc.), and utilizes such data to determine if an RF transmission that has taken place within a vehicle should initiate an action (for example, sending an instruction). For example, if an RF transmission is determined to have taken place within a vehicle and GPS data indicates that the vehicle is stationary the Rules Engine can determine that no action is to be taken. Similarly, of the data indicates that an RF transmission from a wireless device has taken place within the vehicle while it is moving and Bluetooth data indicates that a hands-free headset associated with the driver is in use, no action may be taken. Alternatively, if the data supplied to the Rules Engine indicates unauthorized or illegal use of a wireless device within the vehicle (for example, while moving and without the use of a hands-free headset) the Rules Engine can transmit an instruction to the Detector Module to provide an alert.

Figure 2:
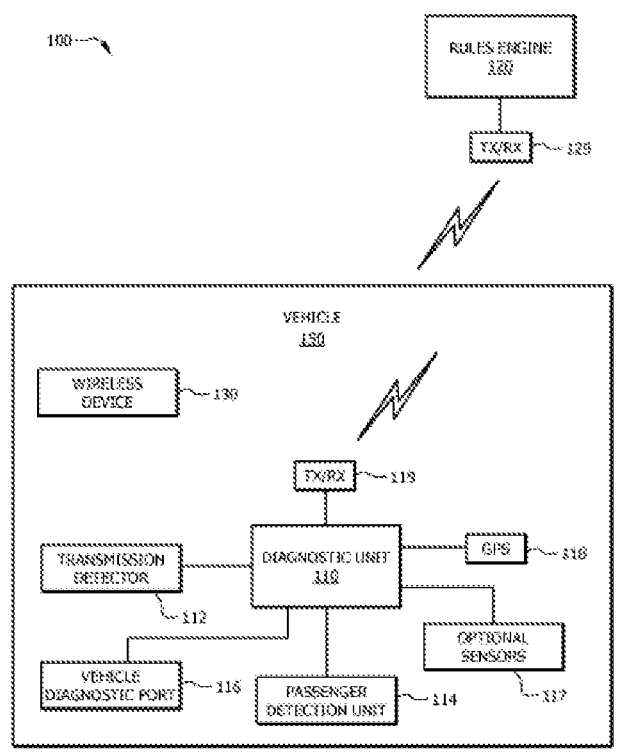
FIG. 2 is a schematic diagram of an embodiment of a vehicle wireless transmission detection system.

FIG. 2 depicts an example of processing that can be performed by the Detector Module in some embodiments of the inventive concept. It should be understood that the example shown is merely a single illustrative example, and is not intended to be limiting. As shown, the Detector Module receives inputs in the form of raw or unprocessed RF transmission data, Bluetooth transmission data, and GPS data. In an initial processing step, the Detector Module compares RF transmission data related to RF energy, duration, etc. to threshold values for these parameters stored in an associated database (as described above). If the signal thresholds are not exceeded it is likely that the associated RF data is non-relevant, and the data is disregarded. If signal threshold values are exceeded it is likely that the associated RF data is a result of wireless device usage, and processing continues. In secondary processing steps, Bluetooth ID data from the Bluetooth transmission is compared to a "white list" of approved Bluetooth devices (for example, hands-free devices associated with vehicle drivers). If the Bluetooth ID corresponds to an approved device it is likely that the wireless device is being operated in a legal and/or safe manner, and the RF data is therefore non-relevant and disregarded. If the Bluetooth ID does not correspond to an approved device (for example, by originating from a wireless speaker or gaming device within the vehicle), it is likely that the wireless device is being used without the aid of a hands-free device and the RF data can be relevant. Relevant (i.e. processed) RF transmission data is forwarded to the Rules Engine by the Detector Module. Alternatively, a database of permitted devices can be accessed by the Rules Engine, and utilized to determine if an unauthorized RF transmission has occurred at the Rules Engine level. As shown in this example, the RF receiver can be disabled prior to transmission of the processed RF transmission data packet, then re-enabled following transmission. It should be appreciated that GPS data can be transmitted to the Rules Engine regardless of the origin of an RF transmission or Bluetooth transmission.

Figure 3:
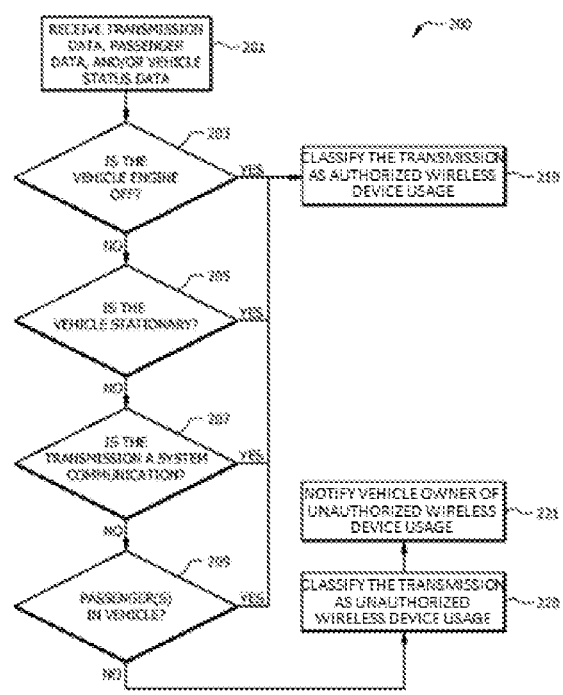
FIG. 3 is a flowchart of an embodiment of a wireless transmission classification method.

FIG. 3 depicts an example of processing that can be performed by the Rules Engine (which is external to the vehicle and can be in communication with a plurality of Detector Modules) in some embodiments of the inventive concept. It should be understood that the example shown is merely a single illustrative example, and is not intended to be limiting. As shown, in this example processed RF data is received by the Rules Engine from the Detector Module along with GPS data. In an initial processing step, GPS data is used to determine if the vehicle is moving. If the vehicle is not moving, it is likely that the processed RF transmission data originated from a wireless device that is in use in a non-moving vehicle, and is therefore irrelevant and can be disregarded. If the GPS data indicates that the vehicle is moving a subsequent processing step can be performed to determine if the processed RF transmission data is relevant. In the example shown the Rules Engine compares the identity of the Detector Module from which the transmission originated with a database of vehicles that are carrying passengers (for example, as input by a manager of a fleet of vehicles administered by the system). If a passenger is present in the vehicle, it is probable that the processed RF transmission data originated from a wireless device in use by a passenger and is therefore not relevant (and subsequently disregarded). If such a comparison shows that no passenger is present the Rules Engine can transmit an instruction to the Detector Module, for example an instruction to supply the driver with an alert. Such an alert can be in the form of a recorded verbal warning, and can be supplied from an audio file stored in a database of the Detector Module.

In some embodiments the Detector Module can supply data related to passenger occupancy of the vehicle that is gathered by sensors or other systems of the vehicle. For example, data gathered by the vehicle to confirm safety belt usage or weight present in a passenger seat (in order to activate appropriate airbag systems) can be provided to the Detector Module. Such data can be utilized by the Detector Module or transmitted to the Rules Engine to indicate the presence of a passenger in the vehicle. In some embodiments the presence of a passenger can be used to disregard an RF detection that would otherwise qualify as unauthorized usage.

In some embodiments of the inventive concept, the Rules Engine can utilize GPS data provided by the Detector Module to determine the location, velocity, and other movement-related characteristics of the vehicle. In such embodiments, the Rules Engine can transmit an instruction to the Detector Module to provide an alert that is related to vehicle location and/or velocity. For example, utilizing GPS data provided by the Detector Module the Rules Engine can transmit an instruction to the Detector Module to provide an alert to the driver or other vehicle occupant that the vehicle is operating outside of an authorized area. Such an alert can be in the form of a recorded verbal warning, and can be supplied from an audio file stored in a database of the Detector Module. Similarly, utilizing GPS data provided by the Detector Module the Rules Engine can transmit an instruction to the Detector Module to provide an alert to the driver or other vehicle occupant that the vehicle is operating in excess of speed limits for the area within which the vehicle is operating. Such instructions can be sent from the Rules Engine regardless of the status of RF transmissions from wireless devices within the vehicle.

An alert provided by the Detector Module at the instruction of the Rules Engine can be an audio alert, a visual alert, or a combination of these. In some embodiments a preferred embodiment the alert is an audio alert in the form of an audio file stored on the database associated with the processor of the Detector Module. Such audio files can include warning sounds and/or recorded vocal warnings.

In some embodiments of the inventive concept, the Rules Engine can transmit or "push" other information or instructions to a specified Detector Module, all Detector Modules with which it is in communication, or a specified subset of Detector Modules. For example, the Rules Engine can transmit updates to a "white list" of permitted Bluetooth devices stored in the database that is associated with the processor of the Detector Module. In other embodiments the Rules Engine can update or otherwise revise threshold values stored in the database and used to differentiate non-relevant RF transmissions. In such embodiments the Rules Engine can receive data from the Detector Module and update or revise threshold values in a dynamic fashion. This advantageously permits adaption of the warning system to changing conditions and improves warning accuracy.

In other embodiments of the inventive concept, the Rules Engine can transmit a signal or data indicating passenger status to the detection module. In such an embodiment a user (for example, the administrator of a fleet of vehicles) can input to the Rules Engine that a specified vehicle will be carrying passengers in addition to the driver. The Rules Engine can then in turn signal and/or transmit data to the Detector Module associated with the specified vehicle. Such data can be used to, for example, modify threshold values or implement an alternative set of alerts. In still other embodiments the Rules Engine can transmit revised or updated software or firmware to a specified Detector Module or to all Detector Modules in the system.

In some embodiments of the inventive concept communication between the Detector Module and the Rules Engine occurs at regular intervals. Such intervals can range from 1 second to 30 or more minutes. In preferred embodiments the Detector Module transmits to the Rules Engine at regular intervals ranging from 3 minutes to 10 minutes between transmissions. It should be appreciated that such transmissions have the potential to generate a false indication of wireless device use within the vehicle, particularly when cellular RF frequencies are used by the Detector Module. In order to minimize or eliminate such self interference, the processor can be instructed to disregard inputs receive from an associated RF antenna when transmissions are being made by the Detector Module. Similarly, if a separate antenna module is used to initially collect and transfer data related to RF transmissions to the Detector Module such an antenna module can be temporarily disabled when the Detector Module is transmitting.

As noted above, the detector can provide alerts. Such alerts can be in the form of a display that is visible within the vehicle. Alternatively, such alerts can be audible alerts (for example an alarm or recorded voice message). In the instance of a voice alert, a male or a female voice can be selected. Alternatively, alerts can be transmitted to a mobile device within the vehicle, for example through the use of an application running on a processor of the mobile device.

In some embodiments of the inventive concept, a user can upload or otherwise enter data that identifies specific passengers that are permitted within the vehicle. For example, a user can enter or upload data related to one or more passengers to a database that is in communication with the Rules Engine, providing a "white list" of permitted passengers. Identifying data can include identifying data related to a passenger's wireless device. The Rules Engine utilize this information directly or can transmit this data to the Detector Module, where it can be stored in a local database. Detection of mobile device usage by an authorized passenger can, for example, not trigger warnings or other actions by or from the detector. Alternatively, the Rules Engine may utilize information provided by the user to determine that transmission data received from the detector is associated with a mobile device associated with an authorized passenger. In an alternative embodiment, a passenger can update a database associated with either the Rules Engine or the Detector Module (for example, via a transmission from the Rules Engine) by transmitting an identifying code from their mobile device. Such an identifying code can be provided to the passenger by a vehicle owner or other authorized individual, and can be transmitted in the form of a telephone call followed by keypad entry, text message, email, SMS code, voice message (with suitable voice recognition), or any other suitable means.

A system of the inventive concept is schematically depicted in FIG. 2, which depicts an embodiment of a vehicle wireless transmission detection system 100. Vehicle wireless transmission detection system 100 can include a Detector Module 110, which can be positioned in a vehicle 150. The Detector Module 110 can be configured to communicate with a Rules Engine 120 to determine whether a transmission detected in the vehicle 150 should be classified as authorized or permitted wireless device usage or unauthorized wireless device usage. The system 100 can further comprise a transmission detector 112 configured to detect transmissions by a wireless device 130, a vehicle diagnostic port 116 configured to output data related to the vehicle 150, a passenger detection unit 114, and a GPS receiver 118. Such a transmission detector can include one or more wide band RF receivers, one or more narrow band RF receivers, or a combination of wide band and narrow band RF receivers. In a preferred embodiment the transmission detector includes two or more RF receivers selected so that their frequency reception ranges lie within the range of transmission frequencies used by commercial wireless devices (for example, the range of transmission frequencies used for transmission to cellular networks) and sources of potential RF interference. In a preferred embodiment the RF receiver can detect RF transmissions across all allocated RF frequency bands. Such an arrangement advantageously permits use of the system with a wide variety of vehicles and types of wireless devices. In some embodiments of the inventive concept the transmission detector 112 has a single antenna used for detection of RF signals associated with long range (i.e. greater than 100 meters) use, for example those from wireless devices and potential interfering sources (as opposed to Bluetooth and other short-range transmissions).

The Detector Module 110 can receive data from the transmission detector 112, vehicle diagnostic port 116, passenger detection unit 114, and a GPS receiver 118 and transmit such data to the rules engine 120 via a modem or transceiver (Tx/Rx) 119 connected to the Detector Module. The Rules Engine 120 can include a similar Tx/Rx device.

Vehicle 150 can be any automobile such as a car, truck, semi-truck, etc. Most modern automobiles include computer systems that monitor various aspects of vehicle status, such as engine speed, seat occupancy, and safety device engagement. Data related to vehicle status can be provided to the Detector Module 110, for example via the vehicle diagnostic port 116. A vehicle diagnostic port 116 is standard equipment on most modem vehicles (e.g. produced after 1996). As an example, a vehicle diagnostic port 116 can include an onboard diagnostics (OBD) port, an OBD II port, a controller area network (CAN) bus port, etc. Such a vehicle diagnostic port 116 can be configured to transmit vehicle status data to any connected device. Vehicle status data can include information about the vehicle's automotive systems such as an engine, transmissions, etc., information regarding the vehicle's 150 position, and/or other vehicle status information. For example, vehicle status data can include indications of whether the engine is operational or not at a specified time, whether the transmission is engaged at a specified time, whether an airbag has deployed, whether emergency, whether the vehicle's emergency brake is engaged, whether the vehicles hazard lights are engaged, etc. The vehicle diagnostic port 116 can also transmit data regarding vehicle systems that can indicate vehicle occupancy, which can be interpreted as passenger data. For example, a vehicle diagnostic port 116 can be configured to transmit data indicating whether an airbag is engaged in a passenger seat, whether a safety restraint (e.g. seat belt) is engaged, whether a pressure sensors indicates a passenger seat is occupied. The Detector Module 110 can be connected to the vehicle diagnostic port 116 and can receive any vehicle status data and/or passenger data as input.

The Detector Module 110 can also be connected to a passenger detection unit 114. The passenger detection unit 114 can be a sensor installed in the vehicle to detect passenger data. For example, a passenger detection unit 114 can include an infrared sensor configured to indicate if body heat is present in the passenger seat, if weight is present in the passenger seat, if a passenger seat belt is engaged, etc. As another example, the passenger detection unit 114 can include an RFID sensor or other short range sensor configured to sense the presence of RFID and other short range transmitters, for example an RFID chip in an employee ID or a short range transmitter integrated into a smart phone. As another example, the passenger detection unit 114 can include a biometric sensor such as a retinal scanner, a fingerprint scanner, etc. A vehicle 150 door can be designed to remain locked until a passenger or other occupant registers with the vehicle 150 via a biometric scan. Regardless of the embodiment, the passenger detection unit 114 can transmit passenger data to the Detector Module 110. The passenger data can indicate the number of occupants in the vehicle 150 at a specified time, the location of the occupants in the vehicle 150, whether a passenger (i.e. an occupant of the vehicle that is not directly involved in operating the vehicle) is present in the vehicle 150 passenger seat, etc.

The Detector Module 110 can also be connected to a GPS receiver 118. The GPS receiver 118 can receive GPS signals from GPS satellites and determine the location of the vehicle 150 at a specified time and/or over a set of time intervals (for example, to determine vehicle speed and/or direction). The GPS receiver 118 can transmit vehicle location, speed, and/or direction to the Detector Module 110 as vehicle status data. The Detector Module 110 can use the data from the GPS receiver 118 to determine whether the vehicle 150 is in motion at a specified time and/or the speed of the vehicle 150 at a specified time.

The Detector Module 110 can also be connected and/or include a transmission detector 112, which can include an antenna tuned to receive and/or detect an RF signal from a range of RF frequencies that includes those used by a wireless device 130. For example, the transmission detector 112 can include an antenna configured to detect RF signals over bands of frequencies commonly used for wireless transmissions such as Global System for Mobile Communications (GSM) signals, Code division multiple access (CDMA) signals, Universal Mobile Telecommunications System (UMTS) signals, Institute of Electrical and Electronics Engineers' (IEEE) 802.11 standard (Wi-Fi) signals, Worldwide Interoperability for Microwave Access (Wi-MAX) signals, 3rd Generation Partnership Project (3GPP) signals and/or any other signals commonly used by a wireless device 130 that can be available to a vehicle driver. In a preferred embodiment of the inventive concept the transmission detector 112 can detect RF transmissions of all seven allocated RF bands. The transmission detector 112 can transmit any detected RF signals (e.g. signals from wireless device 130) and/or data related to the RF signals to the Detector Module 110 unit as transmission data. As an example, the transmission detector 112 can transmit a detected RF signal directly to the Detector Module 110 or can perform signal analysis on the signal and transmit the results of the analysis (e.g. data indicating a transmission occurred in a specified frequency band, had a certain energy, had a certain duration, etc.) to the Detector Module 110.

The Detector Module 110 can communicate with the Rules Engine 120 via Tx/Rx 119. Tx/Rx 119 can include a transmitter for generating transmission signals, a receiver for receiving transmission signals (for example, from the Rules Engine 120), and at least one antenna for sending signals to and/or receiving signals from the Rules Engine 120 via Tx/Rx 129 (which can be similar to Tx/Rx 119). Tx/Rx 119 can be configured to employ any wireless transmission technology that is also supported by Tx/Rx 129, for example, GSM. The diagnostic unit 110 can maintain constant communication with the rules engine 120 or can contact the rules engine 120 only upon the occurrence of a predetermined event. For example, the Detector Module 110 can contact the Rules Engine 120 upon engine start, upon determining the vehicle 150 has left a certain geographic region (e.g. by analyzing GPS 118 data), upon determining the vehicle is in motion, upon receiving transmission data from the transmission detector 112, or upon any other event that can be of interest to the vehicle owner 150 and/or the system 100.

The Detector Module 110 can perform signal processing on the transmission data from the transmission detector 112, as described above. For example, the Detector Module 110 can disregard detected signals if they fail to surpass a threshold value (as described above). As noted above, this can be accomplished by identifying a range of RF frequencies that the received transmission lies within, and comparing the signal characteristics to various threshold values associated with the frequency range. The results of such an analysis can be used to generate a data packet that is transmitted to the Rules Engine 120 for further analysis. The Detector Module 110 can also send any information to the Rules Engine 120, such as transmission data, passenger data, vehicle status data, etc. The Detector Module 110 can send all relevant data during each communication or can send only data that has changed since the last communication between the Detector Module 110 and the Rules Engine 120. In addition or in the alternative, the Detector Module 110 can send data to the Rules Engine 120 upon request.

The Rules Engine 120 can be located remotely from vehicle 150 and can serve two or more Detector Modules 110. The Rules Engine 120 can communicate with a Detector Module 120 via Tx/Rx 129 which can be any device configured to communicate with Tx/Rx 119, for example, a base station. The Rules Engine 120 can be configured to receive transmission data, passenger data, Bluetooth data, and/or vehicle status data from the Detector Module 110 and classify a detected transmission as unauthorized wireless device usage. As described above, the Rules Engine 120 can classify an RF transmissions as unauthorized wireless device usage based on signal characteristics encoded in a data packed received from the Detector Module 110, and can utilize such data in combination with vehicle location data, Bluetooth data, passenger data, vehicle status data (for example, if the engine is off or if the vehicle 150 is stationary), and/or other factors to make such a determination.

Upon classifying a transmission as unauthorized wireless device usage, the Rules Engine 120 can notify the vehicle 150 owner, for example, via email, text message, phone, mail, or any other contact method. The Rules Engine 120 can cause a notification to be sent immediately or can cause the occurrence of the driver wireless device usage to be stored so that a report of all occurrences of driver wireless device usage can be sent to the vehicle 150 owner at once. For example, an owner of a fleet of vehicles 150 can receive a monthly report of driver wireless device usage comprising the date, time, the vehicle 150, type of transmission detected, etc. The Rules Engine 120 can also send commands to the Detector Module 110 in response to the classification. For example, the Detector Module 110 can include an alarm, a light, or other alert system, and the Rules Engine 120 can send a command to the Detector Module 110 to engage the alert system to warn the vehicle driver that driver wireless device usage has been detected. As another example, the Detector Module 110 can include an audio and/or video recorder which can be positioned to record the driver's seat of the vehicle 150. Upon classifying a transmission as driver wireless device usage, the Rules Engine 120 can send a command to engage the recorder(s) and return any recording to the Rules Engine 120 for storage and/or notification to the vehicle 150 owner. As such, the Detector Module 110 and the Rules Engine 120 can communicate to classify wireless transmissions, report improper wireless device use by a vehicle 150 driver, and/or discourage continued improper wireless device via alarm systems.

The Detector Module 110 can also be connected to one or more optional sensors 117. The optional sensors 117 can provide additional vehicle status data, transmission data, and/or passenger data that can provide context for a transmission and can be of use in classifying a transmission as unauthorized wireless device usage. For example, optional sensors 117 can include an accelerometer configured to measure a vehicle crash and/or changes in engine vibration. Accelerometer measurements can be sent to the Rules Engine 120 as vehicle status data. In the event of a crash or unusual engine activity (e.g. as measured by optional sensors 117 and/or by the vehicle diagnostic port 116), wireless transmissions can be deemed acceptable under the circumstances and can be classified as authorized wireless device usage. As another example, the optional sensors 117 can include a sensor configured to detect hands free wireless signals, such as a detector configured to detect Bluetooth communications. Wireless device usage can be deemed acceptable when a driver is using a wireless device in hands free mode. As such, the Rules Engine 120 can classify a transmission as authorized wireless device usage if the transmission corresponds to a detected hands free signal received from an optional sensor 117 via the Detector Module 10.

Rules Engine 120 can be positioned outside of the vehicle 150 to allow the Rules Engine 120 to service two or more Detector Modules 110. Employing a centralized Rules Engine 120 can also allow updates to Rules Engine 120 thresholds, database contents, and logic functions to easily propagate over a system 100 that includes two or more vehicles 150 and/or Detector Modules 110. Employing a centralized Rules Engine 120 can also reduce the complexity of the Detector Module 110, which can reduce costs on a per vehicle 150 basis. In some embodiments a Rules engine 120 can be positioned in the vehicle 150 and/or in a Detector Module 110 to provide an independent system. In such an embodiment, the Rules Engine 120 can be dedicated to a particular Detector Module 110 and/or vehicle 150 and updated manually and/or remotely via a Tx/Rx 119 and/or 129.

Figure 5:
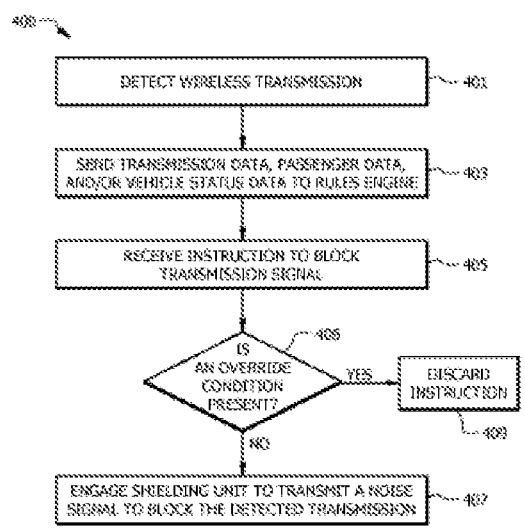
FIG. 5 is a flowchart of an embodiment of a wireless transmission shielding method.

As noted above, embodiments of the inventive concept can determine the occurrence of unauthorized use of a wireless device in a vehicle based on comparison of received RF signal characteristics to various thresholds, in combination with logic based on vehicle position and data related to the geographic location of fixed sources of RF interference, in combination with other factors. In other embodiments of the inventive concept, determination of the occurrence of an unauthorized transmission from a wireless device from within a vehicle can be accomplished by determining if a passenger (i.e. an occupant of the vehicle that is not directly involved in its operation) is present, and presumably using the wireless device. A flowchart depicting such a process is shown in FIG. 5.

FIG. 3 shows a flowchart of an embodiment of a wireless transmission classification method 200, which can be implemented on a Rules Engine 120, Detector Module 110, and/or combinations thereof. At step 201, method 200 can receive transmission data, passenger data, and/or vehicle status data and proceed to step 203. The transmission data can include data related to a detected wireless transmission, the passenger data can include data related to occupancy of a vehicle such as vehicle 150, and the vehicle status data can include information regarding the status of the vehicle's 150 systems, vehicle position, etc. The method 200 can proceed to step 210 if the engine is not in operation (e.g. based on vehicle status data from a vehicle diagnostic port 116) and classify a detected transmission as authorized (i.e. passenger) wireless device usage. The method 200 can proceed to step 205 if the engine is in operation and the vehicle is stationary. The method 200 can proceed to step 210 if the vehicle is stationary (e.g. based on vehicle status data and/or data from a GPS receiver 118) or proceed to step 207 if the vehicle is not stationary (e.g. in motion). At step 207, the method can filter out system communications (e.g. communications between a Rules Engine 120 and a Detector Module t 110). For example, if a detected transmission occurred at about the same time as a known system communication, the detected transmission can be classified as a probable system communication and disregarded. The method can proceed to step 210 if the transmission is a system communication and step 209 if the transmission is not a system communication. At step 209, the method can review the passenger data (e.g. data obtained from a vehicle diagnostic port 116, a passenger detection unit 114, etc.) and determine if there are passengers in the vehicle. For example, the method 200 can determine if there is a passenger in the vehicle passenger seat based on data indicating safety belt usage, activation of a passenger side air bag system, weight in the seat, etc. The method can proceed to step 210 if a passenger presence is indicated. As such, the method 200 can assume any wireless transmissions made when a passenger is present are made by the passenger and not by a vehicle driver and can classify such transmissions as authorized wireless device usage. If the detected transmission received at step 201 cannot be classified as authorized wireless device usage at step 210 based on the determinations made at steps 203, 205, 207, and/or 209, the method can proceed to step 220 and classify the detected transmission as unauthorized wireless device usage. Once the transmission is classified as unauthorized wireless device usage at step 220, the method can notify the vehicle owner of the unauthorized wireless device usage at step 221. As discussed above, the method can also save and/or aggregate incidents of unauthorized wireless device usage for a report and/or alert the driver via an alarm.

Figure 4:
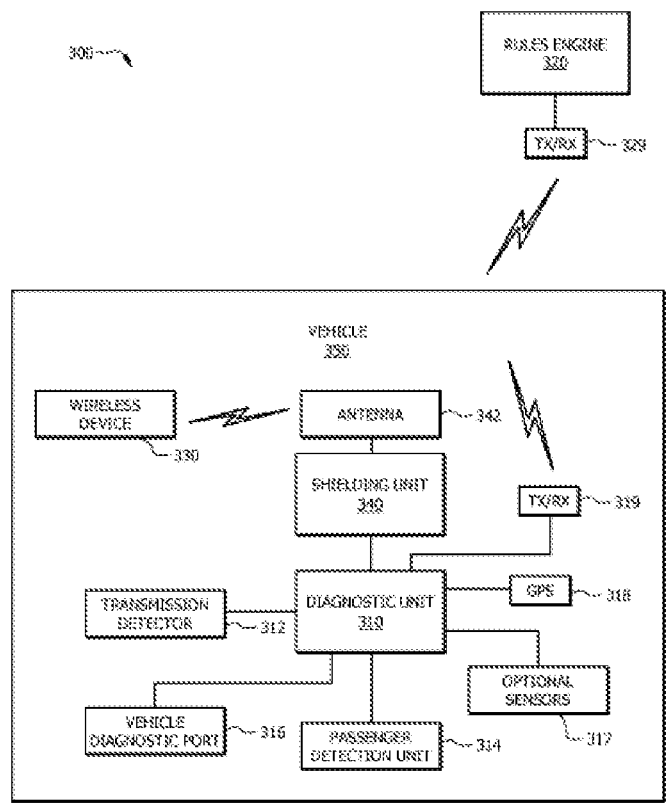
FIG. 4 is a schematic diagram of an embodiment of an in-vehicle wireless transmission detection and shielding system.

Some embodiments of systems and methods of the inventive concept can include outputs configured to interact or provide instructions to a shielding unit, or can incorporate a shielding unit. FIG. 4 is a schematic diagram of an embodiment of an in-vehicle wireless transmission detection and shielding system 300. System 300 can include a vehicle 350, a Detector Module 310, a Tx/Rx 319, a transmission detector 312, a vehicle diagnostic port 316, a passenger detection unit 314, a GPS receiver 318, optional sensors 317, a Rules Engine 320, and a Tx/Rx 329. These can be similar to vehicle 150, Detector Module 110, Tx/Rx 119, transmission detector 112, vehicle diagnostic port 116, passenger detection unit 114, GPS receiver 118, optional sensors 117, Rules Engine 120, and Tx/Rx 129, and can be used to classify wireless transmissions by a wireless device 330, which can be substantially similar to wireless device 130. System 300 can further comprise a shielding unit 340 (or, alternatively, configured to communicate with a shielding unit 340), which can be in communication with the Detector Module 310. Upon classifying a detected transmission as unauthorized wireless device usage (as described above), the Rules Engine 320 can instruct the Detector Module 310 to engage a shielding unit 340. Shielding unit 340 can, for example, generate a noise signal to shield the detected transmission and transmit the noise signal in the vehicle using antenna 342. Shielding as used herein means to interrupt an ongoing transmission and/or prevent the initiation of a transmission (e.g. by interrupting a communications handshake.) For example, a noise signal can be transmitted across all commonly used frequency bands to shield all transmissions. The noise signal can be limited to an electric field strength of about 200 microvolts per meter or less (e.g. as measured at a distance of three meters) and/or limited to an electric field strength of about 500 microvolts or less (e.g. as measured at a distance of three meters), which can shield the transmission without significantly affecting transmissions of other wireless device users positioned outside of the vehicle 350. As a further example, the field strength limit of 200 microvolts can be employed when shielding signals in frequency bands of about 700 MHz and about 850 MHz and the 500 microvolts field strength limit can be employed when shielding signals in frequency bands of about 1900 MHz and about 2100 MHz. The noise signal transmission can be limited to a range of about 0.5 seconds to about 3 seconds, which can be sufficient time to shield an ongoing transmission.

As another example, the system 300 can shield signals in a targeted manner to reduce the possibility of affecting transmissions of other wireless device users positioned outside of the vehicle 350. During a communication between a wireless device 330 and an associated tower, the wireless device 330 can transmit a signal to the tower which can be referred to as an uplink and can receive a signal which can be referred to as a downlink. The Rules Engine 330 can determine the frequency or frequency band of the transmission uplink based on the transmission data received from the Detector Module 310 as measured by the transmission detector 312. The Rules Engine 330 can instruct the Detector Module 310 to engage a shielding unit 340 to transmit a noise signal of the same frequency as the uplink signal and/or a noise signal across a frequency band that encompasses the frequency of the uplink signal.

As another example, the Rules Engine 330 can include information that an uplink frequency band is associated with one or a small number of downlink frequency bands based on the wireless networks commonly deployed in a specified geographic region. The Rules Engine 330 can command the Detector Module 310 to engage a shielding unit 340 to transmit a noise signal across the downlink frequency band(s) associated with the uplink frequency band that includes the frequency of the uplink transmission as detected by the transmission detector 312. As a specific example, in the United States, GSM and/or CDMA systems can employ a frequency band ranging from about 824 megahertz (MHz) to about 849 MHz as an uplink frequency band and a frequency band ranging from about 869 MHz to about 894 MHz as a downlink frequency band. As another specific example, GSM and/or CDMA systems can employ a frequency band ranging from about 1850 MHz to about 1910 MHz as an uplink frequency band and a frequency band ranging from about 1930 MHz to about 1990 MHz as a downlink frequency band. If a detected transmission comprises a frequency between about 824 MHz and about 849 MHz, the rules engine 330 can command the diagnostic unit 310 to engage the shielding unit 340 to transmit a noise signal across the frequency band ranging from about 869 MHz to about 894 MHz. Likewise, if a detected transmission comprises a frequency between about 1850 MHz and 1910 MHz, the rules engine 330 can command the diagnostic unit 310 to engage the shielding unit 340 to transmit a noise signal across the frequency band ranging from about 1930 MHz to about 1990 MHz.

As another example, the Rules Engine 320, Detector Module 310, and/or the shielding unit 340 can exclude a transmission classification as unauthorized wireless device usage and override an instruction to shield a signal to allow a driver to access emergency services (e.g. emergency calls to a police station) under certain conditions. For example, the Rules Engine 320, Detector Module 310, and/or the shielding unit 340 can determine to reclassify a transmission and/or override a shielding instruction in the event of an emergency condition such as a crash (e.g. vehicle 350 hazard lights are on, vehicle 350 airbags are deployed, optional sensor 317 detects shock consistent with a crash, vehicle 350 emergency brake activation, etc. As such, shielding can be discontinued automatically and/or by action of the driver to allow for communication with emergency services.

FIG. 5 is a flowchart of an embodiment of a wireless transmission shielding method 400, which can be implemented by a Rules Engine 320, Detector Module 310 and/or a shielding unit 340. At step 401, the method 400 can detect a wireless transmission, for example, an uplink transmission measured by transmission detector 312. At step 403, the method 400 can send transmission data, passenger data, and/or vehicle status data to a Rules Engine. The transmission data can include data indicating the frequency and/or frequency band of the transmission (e.g. the uplink frequency and/or uplink frequency band). At step 405, the method 400 can receive instructions to shield the detected transmission signal. The instructions can include an indication of the frequencies and/or frequency bands to be shielded. At step 406, the method can determine if there is an override condition present (e.g. hazard lights engaged, airbags deployed, crash detected, etc.) The method 400 can proceed to step 409 and discard the instruction to shield the detected transmission if an override condition is present. The method 400 can proceed to step 407 if no override condition is present. At step 407, the method 400 can engage or instruct a shielding unit (e.g. shielding unit 340) to transmit a noise signal to shield the detected transmission. Depending on the embodiment, the noise signal can be transmitted across substantially all frequency bands used by wireless devices, a detected transmission's uplink frequency, a detected transmission's uplink frequency band, and/or at least one downlink frequency band associated with the detected transmission's uplink frequency and/or frequency band.

Figure 6:
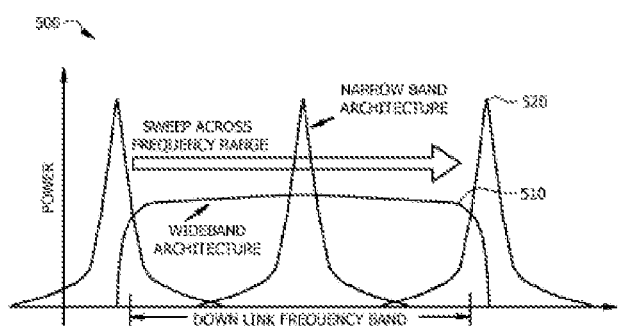
FIG. 6 is a diagram of an embodiment of the power usage of a wideband noise signal verses a narrow band noise signal sweep over a frequency band.

FIG. 6 is a diagram 500 of an embodiment of the power usage of a wideband noise signal 510 versus a narrow band noise signal sweep 520 over a frequency band, for example, as transmitted by shielding unit 340. As shown in FIG. 6, signal sweep 520 can comprise a plurality of pulses, which can shield a frequency band. Wideband noise signal 510 can also shield substantially all of a frequency band of interest, but can use less power than signal sweep 520. Wideband noise signal 510 can also employ a relatively constant maximum power level across the frequency band, which can prevent the transmission of high power level spikes that can unintentionally interfere with surrounding devices. Depending on the embodiment, shielding unit 340 can employ wideband noise signal 510, narrow band noise signal sweep 520, or combinations thereof.

Figure 7:
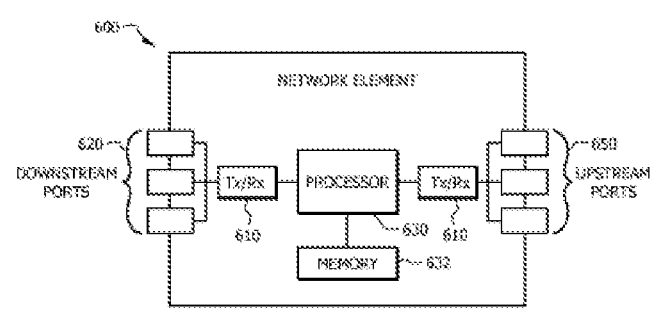
FIG. 7 is a schematic diagram of an embodiment of a network element (NE.)

FIG. 7 is a schematic diagram of an embodiment of a NE 600, which can function as a node in network 100 and/or 300, for example, a diagnostic unit 110/310, a rules engine 120/320, and/or a shielding unit 340. One skilled in the art will recognize that the term NE encompasses a broad range of devices of which NE 600 is merely an example. NE 600 is included for purposes of clarity of discussion, but is in no way meant to limit the application of the present disclosure to a particular NE embodiment or class of NE embodiments. At least some of the features/methods described in the disclosure can be implemented in a network apparatus or component, such as an NE 600. For instance, the features/methods in the disclosure can be implemented using hardware, firmware, and/or software installed to run on hardware. The NE 600 can be any device that transports frames through a network. As shown in FIG. 6, the NE 600 can comprise transceivers (Tx/Rx) 610, which can be transmitters, a receiver, or combinations thereof. A Tx/Rx 610 can be coupled to plurality of downstream ports 620 for transmitting and/or receiving frames from other nodes, a Tx/Rx 610 coupled to plurality of upstream ports 650 for transmitting and/or receiving frames from other nodes and/or antennas, and a processor 630 coupled to the Tx/Rx 610 to process the frames and/or determine which nodes to send frames to. The processor 630 can comprise one or more multi-core processors and/or memory devices 632, which can function as data stores. The downstream ports 620 and/or upstream ports 650 can contain electrical and/or optical transmitting and/or receiving components.

It is understood that by programming and/or loading executable instructions onto the NE 600, at least one of the processor 630, memory 632, and/or Tx/Rx 610 are changed, transforming the NE 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change can be preferred to be implemented in software, because re-spinning a hardware implementation is more expensive than re-spinning a software design. Generally, a design that is stable that will be produced in large volume can be preferred to be implemented in hardware, for example, in an application specific integrated circuit (ASIC), because for large production runs the hardware implementation can be less expensive than the software implementation. Often a design can be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions can be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for reporting wireless device use within a vehicle comprising:
    initiating operation of a detector module within a vehicle when a vehicle engine is in operation;
    using the detector module, repeatedly scanning an RF spectrum at a first time interval, wherein the RF spectrum comprises a plurality of RF bands, wherein each one of the plurality of RF bands has an associated signal energy threshold and wherein the signal thresholds are nonidentical;
    using the detector module, measuring a second time interval over which a received RF signal exceeds at least one of the signal energy thresholds;
    using the detector module, determining that a detection event has occurred by determining if the second time interval exceeds a time threshold;
    using the detector module, counting a number of the detection events that occurs within a third time interval;
    using the detector module, preparing a signal data packet comprising a band identifier and the number of detection events occurring within the third time interval, wherein the band identifier comprises information related to the RF band of the received RF signal;
    transmitting the signal data packet from the detector module to a rules engine located remotely from the vehicle;
    transmitting GPS data associated with the vehicle to the rules engine;
    using the rules engine, determining if a notification condition exists using the GPS data and the signal data packet;
    transmitting a first instruction from the rules engine to the detector module when a notification condition exists; and
    performing of the first instruction by the detector module, wherein the signal thresholds, the time threshold, and at least one of the group consisting of the first time interval, the second time interval, and the third time interval are configurable by the rules engine.

2. The method of claim 1, wherein the GPS data is transmitted by the detector module.

3. The method of claim 1, wherein the secondary data comprises global positioning system data.

4. The method of claim 3, wherein a notification condition exists if the transmitted data indicates wireless device use and the global positioning system data indicate that the vehicle is moving.

5. The method of claim 1, further comprising the step of transmitting a second instruction from the rules engine to a shielding device if the notification condition exists.

6. The method of claim 5, wherein the second instruction is not transmitted to the shielding device when both an emergency condition exists and the notification condition exists.

7. The method of claim 5, wherein a notification condition does not exist if the transmitted data indicates wireless device use and the secondary data indicates that a passenger is present in the vehicle.

8. The method of claim 1, further comprising receiving identifying transmission data at the detector module, wherein the identifying transmission data comprises a device-specific identifier.

9. The method of claim 8, wherein the identifying transmission data is Bluetooth data.

10. The method of claim 8, wherein the device-specific identifier is compared to an identifier archive stored on the database of the detector module, and wherein data related to the RF signal is not transmitted to the Rules Engine if the device-specific identifier is present in the identifier archive.

11. The method of claim 10, wherein content of the identifier archive is modified by the rules engine.

12. The method of claim 10, wherein content of the identifier database is modified on receipt of a code from the wireless device by the rules engine.

13. The method of claim 10, wherein content of the identifier database is modified on receipt of user input to the rules engine, wherein the user is not an occupant of the vehicle.

14. The method of claim 8, wherein the device-specific identifier is compared to an identifier archive stored on the database of the detector module, and wherein a notification condition exists if the device-specific identifier is not present in the identifier archive.

15. The method of claim 14, wherein content of the identifier archive is modified by the rules engine.

16. The method claim 14, wherein content of the identifier database is modified on receipt of user input to the rules engine, wherein the user is not an occupant of the vehicle.

17. The method of claim 1, wherein the instruction comprises a directive to play an audio file stored on a database of the detector module.

18. The method of claim 1, further comprising the step of updating the stored threshold value by the Rules Engine.

19. The method of claim 1, further comprising the step of updating firmware of the detector module by the rules engine.

20. The method of claim 1, wherein the rules engine is communicatively coupled to a plurality of detector modules, and wherein each detector module is collocated with a different vehicle.

21. The method of claim 1, wherein receiving of the RF signal is suspended during transmitting of the data.

22. The method of claim 1, wherein the detector module comprises a plurality of RF detectors, and wherein each of the plurality of RF detectors has an associated stored threshold value.

23. The method of claim 22, wherein the plurality of RF detectors comprises at least one narrow band detector.

24. The method of claim 22, wherein the plurality of RF detectors comprises at least one broad band detector.

25. The method of claim 22, wherein the plurality of RF detector comprises at least one narrow band detector and at least one broad band detector.

26. The method of claim 1, wherein the signal characteristic comprises signal strength.

27. The method of claim 1, wherein the signal characteristic comprises signal duration.

* * * * *

UNITED STATES PATENT AND TRADEMARK OFFICE
CERTIFICATE OF CORRECTION

Page 1 of 1

PATENT NO. : 10,178,524 B2
APPLICATION NO. : 15/717693
DATED : January 8, 2019
INVENTOR(S) : Keith Morgan, Steven Stewart and Arun Madhav It is certified that error appears in the above-identified patent and that said Letters Patent is hereby corrected as shown below:

On the Title Page

Inventors (72): should read as:
Keith Morgan, Madison, MS (US)
Stephen Stewart, Jackson, MS (US)
Arun Madhav, Thousand Oaks, CA (US)

Signed and Sealed this
Twenty-fifth Day of August, 2020

Andrei Iancu
*Director of the United States Patent and Trademark Office*